US011829854B2

(12) United States Patent
Pavetic et al.

(10) Patent No.: US 11,829,854 B2
(45) Date of Patent: *Nov. 28, 2023

(54) USING MACHINE LEARNING TO DETECT WHICH PART OF THE SCREEN INCLUDES EMBEDDED FRAMES OF AN UPLOADED VIDEO

(71) Applicant: Google LLC, Mountain View, CA (US)

(72) Inventors: Filip Pavetic, Zürich (CH); King Hong Thomas Leung, Saratoga, CA (US); Dmitrii Tochilkin, Zürich (CH)

(73) Assignee: Google LLC, Mountain View, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/403,804

(22) Filed: Aug. 16, 2021

(65) Prior Publication Data

US 2021/0374418 A1    Dec. 2, 2021

Related U.S. Application Data

(63) Continuation of application No. 16/813,686, filed on Mar. 9, 2020, now Pat. No. 11,093,751, which is a
(Continued)

(51) Int. Cl.
*G06K 9/00* (2022.01)
*G06K 9/62* (2022.01)
(Continued)

(52) U.S. Cl.
CPC ........... *G06N 20/00* (2019.01); *G06F 18/214* (2023.01); *G06F 18/241* (2023.01); *G06V 10/25* (2022.01);
(Continued)

(58) Field of Classification Search
CPC ...... G06N 20/00; G06V 10/25; G06V 10/764; G06V 20/41; G06V 20/40; G06F 18/214; G06F 18/241

See application file for complete search history.

(56) References Cited

U.S. PATENT DOCUMENTS

| | | |
|---|---|---|
| 7,697,024 B2 | 4/2010 | Currivan et al. |
| 8,447,708 B2 | 5/2013 | Sabe |
| 8,761,498 B1 | 6/2014 | Wu |
| 9,148,699 B2 | 9/2015 | Shivalingappa et al. |
| 9,357,117 B2 | 5/2016 | Woo et al. |
| 9,787,938 B2 | 10/2017 | Cranfill et al. |
| 9,973,722 B2 | 5/2018 | Deng et al. |

(Continued)

FOREIGN PATENT DOCUMENTS

| | | |
|---|---|---|
| CN | 103679142 A | 3/2014 |
| CN | 105678338 A | 6/2016 |

OTHER PUBLICATIONS

US 10,019,463 B2, 07/2018, Li (withdrawn)*

(Continued)

*Primary Examiner* — Gregory M Desire
(74) *Attorney, Agent, or Firm* — Lowenstein Sandler LLP

(57) ABSTRACT

A system and methods are disclosed for using a trained machine learning model to identify constituent images within composite images. A method may include providing pixel data of a first image as input to the trained machine learning model, obtaining one or more outputs from the trained machine learning model, and extracting, from the one or more outputs, an indication that the first image is a composite image that includes a constituent image, wherein at least a portion of the constituent image is in a spatial area of the first image.

22 Claims, 9 Drawing Sheets

Related U.S. Application Data continuation of application No. 15/444,054, filed on Feb. 27, 2017, now Pat. No. 10,586,111.

(60) Provisional application No. 62/446,057, filed on Jan. 13, 2017.

(51) Int. Cl.
| | |
|---|---|
| *G06N 20/00* | (2019.01) |
| *G06V 20/40* | (2022.01) |
| *G06V 10/25* | (2022.01) |
| *G06F 18/214* | (2023.01) |
| *G06F 18/241* | (2023.01) |
| *G06V 10/764* | (2022.01) |

(52) U.S. Cl.
CPC ............ *G06V 10/764* (2022.01); *G06V 20/40* (2022.01); *G06V 20/41* (2022.01)

(56) References Cited

U.S. PATENT DOCUMENTS

| | | | |
|---|---|---|---|
| 9,992,410 | B2 | 6/2018 | Kim et al. |
| 10,204,274 | B2 * | 2/2019 | Smith, IV ........ H04N 21/23439 |
| 10,230,866 | B1 | 3/2019 | Townsend et al. |
| 10,580,179 | B2 | 3/2020 | Luan et al. |
| 10,984,572 | B1 * | 4/2021 | Zacharia .................. G06T 11/60 |
| 11,107,232 | B2 * | 8/2021 | Li ........................... G06V 20/20 |
| 2009/0208118 | A1 | 8/2009 | Csurka |
| 2010/0067865 | A1 | 3/2010 | Saxena et al. |
| 2014/0363143 | A1 | 12/2014 | Dharssi et al. |
| 2018/0121392 | A1 | 5/2018 | Zhang et al. |
| 2018/0121732 | A1 | 5/2018 | Kim et al. |
| 2018/0121762 | A1 | 5/2018 | Han et al. |
| 2018/0204065 | A1 | 7/2018 | Pavetic et al. |
| 2018/0260668 | A1 | 9/2018 | Shen et al. |
| 2020/0210709 | A1 | 7/2020 | Pavetic et al. |

OTHER PUBLICATIONS

PCT, "Written Opinion of the International Searching Authority", dated Feb. 6, 2018, for International Application No. PCT/US2017/057668, 12 pages.

Jie Yu et al., "Improving Person Detection Using Synthetic Training Data", 2010 IEEE 17th International Conference on Image Processing, Sep. 26-29, 2010, Hong Kong, 4 pages.

Artem Rozantsev et al., "On Rendering Synthetic Images for Training an Object Detector", Ecole Polytechnique Federale de Lausanne, Computer Vision Laboratory, Lausanne, Switzerland; Graz University of Technology, Institute for Computer Graphics and Vision, Graz, Austria, Nov. 28, 2014, 30 pages.

Joseph Redmon et al., "YOLO9000: Better, Faster, Stronger", University of Washington, Allen Institute for AI, http://bjreddie.com/yolo9000, Dec. 25, 2016, 9 pages.

Mario Taschwer et al., "Compound Figure Separation Combining Edge and Band Separator Detection", ITEC, Klagenfurt University (MU), Klagenfurt, Austria; Florida Atlantic University (FAU), Boca Raton, FL, USA, Springer International Publishing, Switzerland, Jan. 3, 2016.

Satoshi Tsutsui et al., "A Data Driven Approach for Compound Figure Separation Using Convolutional Neural Networks", School of Informatics and Computing, Indiana University, Bloomington, Indiana, USA, Aug. 21, 2017, 8 pages.

Constine, J "Facebook launches video Rights Manager to combat freebooting," report of F8 Facebook Developer Conference held Apr. 12-13, 2016; Posted Apr. 12, 2016 on TC's Crunchboard, 7 pages; downloaded from https://techcrunch.com/2016/04/12/oontent-fb/ on Jan. 13, 2017.

Erhan, D., et al. "Scalable Object Detection using Deep Neural Networks," 2014 IEEE Conference on Computer Vision and Pattern Recognition (CVPR), held Jun. 23-28, 2014, 8 pages.

Szegedy C. et al. "Deep Neural Networks for Object Detection," Proceedings of the 26th International Conference on Advances in Neural Information Processing Systems (NPIS), held Dec. 5-10, 2013, 9 pages.

Intellectual Property Office, Combined Search and Examination Report under Sections 17 and 18(3) for Application No. GB1717849-2, dated Apr. 30, 2018, 6 pages.

Michele Pratusevich, "EdVidParse: Detecting People and Content in Educational Videos", Massachusetts Institute of Technology, Jun. 2015, 65 pages.

PCT, "Notification of Transmittal of the International Search Report and The Written Opinion of the International Searching Authority, or the Declaration", dated Feb. 6, 2018, for International Application No. PCT/US2017/057668, 5 pages.

\* cited by examiner

| Spatial Area 501-1 | Spatial Area 501-2 | Spatial Area 501-3 | Spatial Area 501-4 |
|---|---|---|---|
| Spatial Area 501-5 | Spatial Area 501-6 | Spatial Area 501-7 | Spatial Area 501-8 |
| Spatial Area 501-9 | Spatial Area 501-10 | Spatial Area 501-11 | Spatial Area 501-12 |

FIG. 5

| Spatial Area 601-1 | Spatial Area 601-2 | Spatial Area 601-3 |
|---|---|---|
| Spatial Area 601-4 | Spatial Area 601-5 | Spatial Area 601-6 |
| Spatial Area 601-7 | Spatial Area 601-8 | Spatial Area 601-9 |

FIG. 6

USING MACHINE LEARNING TO DETECT WHICH PART OF THE SCREEN INCLUDES EMBEDDED FRAMES OF AN UPLOADED VIDEO

RELATED APPLICATIONS

This application is a continuation application of U.S. patent application Ser. No. 16/813,686, filed Mar. 9, 2020, which is a continuation of U.S. patent application Ser. No. 15/444,054 filed Feb. 27, 2017, now U.S. Pat. No. 10,586,111, which claims the benefit of priority from U.S. Provisional Application No. 62/446,057 filed Jan. 13, 2017, each which is incorporated herein by reference.

TECHNICAL FIELD

Aspects and implementations of the present disclosure relate to image processing, and more specifically, to detecting which part of a screen includes embedded frames of an uploaded video.

BACKGROUND

Content sharing platforms enable users to upload, consume, search for, approve of ("like"), dislike, and/or comment on content such as videos, images, audio clips, news stories, etc. Images typically comprise a plurality of picture elements (e.g., pixels) organized in a particular arrangement, such as a two-dimensional array, and videos typically comprise sequences of images, referred to as frames.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a system and methods are disclosed for training a machine learning model (e.g., a neural network, a support vector machine [SVM], etc.) and using the trained model to process images. In one implementation, a method for training a machine learning model to identify constituent images within composite images comprises generating training data for the machine learning model, wherein generating the training data comprises: generating a composite image comprising a first portion containing pixel data of a first constituent image, and a second portion containing pixel data of a second constituent image, generating a first training input comprising pixel data of the composite image, and generating a first target output for the first training input, where the first target output identifies a position of the first portion within the composite image. The method further comprises providing the training data to train the machine learning model on (i) a set of training inputs comprising the first training input, and (ii) a set of target outputs comprising the first target output.

In some implementations, the second portion of the composite image surrounds the first portion of the composite image. In some implementations, the first constituent image is a frame of a first video and the second constituent image is a frame of a second video. In some implementations, the position of the first portion within the composite image comprises coordinates of an upper left corner of the first constituent image and coordinates of a lower right corner of the first constituent image. In some implementations, each training input in the set of training inputs is mapped to a target output in the set of target outputs. In some implementations, the machine learning model is configured to process a new image and generate one or more outputs indicating (i) a level of confidence that the new image is a composite image including a constituent image, and (ii) a spatial area in which the constituent image is located within the new image.

In an aspect of the present disclosure, a method comprises receiving an input image, processing the input image using a trained machine learning model, and obtaining, based on the processing of the input image using the trained machine learning model, one or more outputs indicating (i) a level of confidence that the input image is a composite image including a constituent image, and (ii) a spatial area that includes the constituent image within the input image. In some implementations, the method further comprises determining that the level of confidence satisfies a threshold condition, and extracting the constituent image from the spatial area within the input image.

In some implementations, the input image comprises a second constituent image that surrounds the constituent image. In some implementations, the constituent image is a frame of a video. In some implementations, the spatial area is one of a plurality of spatial areas of the input image, and wherein a union of the plurality of spatial areas contains all pixels of the input image. In some implementations, the first spatial area is one of a plurality of spatial areas of the input image, and wherein the plurality of spatial areas are uniform in size and shape. In some implementations, the spatial area is one of a plurality of spatial areas of the input image, and wherein at least two of the plurality of spatial areas have different sizes. In some implementations, the spatial area is one of a plurality of spatial areas of the input image, and wherein at least two of the plurality of spatial areas have different shapes.

In an aspect of the present disclosure, a method comprises receiving an input image, and processing the input image using a trained model that is configured to generate, based on pixel data of the input image, one or more outputs indicating (i) a level of confidence that the input image is a composite image including a constituent image, and (ii) a spatial area that includes the constituent image within the input image. In some implementations, the method further comprises determining that the level of confidence satisfies a threshold condition, extracting the constituent image from the spatial area within the input image, creating a fingerprint of the constituent image, and comparing the created fingerprint with stored fingerprints of a plurality of images to determine whether the constituent image is similar to any of the plurality of images.

In an aspect of the present disclosure, an apparatus comprises a memory to store a first image, and a processing device, operatively coupled to the memory, to provide pixel data of a first image as input to a trained machine learning model, obtain one or more outputs from the trained machine learning model, and extract, from the one or more outputs, a level of confidence that the first image is a composite image including a constituent image, and at least a portion of the constituent image is in a particular spatial area of the first image. In some implementations, the processing device is further to determine that the level of confidence satisfies a threshold condition, and extract the constituent image from the particular spatial area of the first image.

In some implementations, the first spatial area is one of a plurality of spatial areas of the first image, and wherein the plurality of spatial areas are uniform in size and shape. In some implementations, the first spatial area is one of a plurality of spatial areas of the first image, and wherein at least two of the plurality of spatial areas have different sizes. In some implementations, the first spatial area is one of a plurality of spatial areas of the first image, and wherein at least two of the plurality of spatial areas overlap. In some implementations, the first spatial area is one of a plurality of spatial areas of the first image, and wherein the plurality of spatial areas are non-overlapping. In some implementations, the first spatial area is one of a plurality of spatial areas of the first image, and wherein at least two of the plurality of spatial areas have different shapes. In some implementations, the trained machine learning model is trained with an input-output mapping comprising an input and an output, the input based on pixel data of a composite image, the composite image comprising a first portion containing pixel data of a fourth image and a second portion containing pixel data of a fifth image, and the output identifying a position of the first portion within the composite image.

Further, computing devices for performing the operations of the above described methods and the various implementations described herein are disclosed. Computer-readable media that store instructions for performing operations associated with the above described methods and the various implementations described herein are also disclosed.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 5 depicts a first set of spatial areas of an image, in accordance with one or more aspects of the present disclosure.

FIG. 6 depicts a second set of spatial areas of an image, in accordance with one or more aspects of the present disclosure.

DETAILED DESCRIPTION

In a content sharing platform, users may upload content (e.g., videos, images, audio clips, etc.) for inclusion in the platform, thereby enabling other users to consume (e.g., view, etc.) the content. In some instances, it might be desirable to prohibit certain types of content from inclusion, such as content containing material of another entity, content containing classified material, content containing age-inappropriate material, and so forth. Accordingly, some content sharing platforms employ automated detection technologies in an attempt to identify and reject such content. The automated detection technologies may create a fingerprint of uploaded content (e.g., by applying a function to frames of a video) to determine whether the created fingerprint is similar to any of the stored fingerprints.

Some users have developed strategies to try to thwart automated detection technologies. For example, users may generate videos in which video frames occupy only a portion of the screen, which can "throw off" feature-based extraction/matching techniques that process the entire screen image. Conventional detection technologies are typically not able to discern that a video frame had been reduced in size and placed within a particular portion of the screen.

Figure 3:
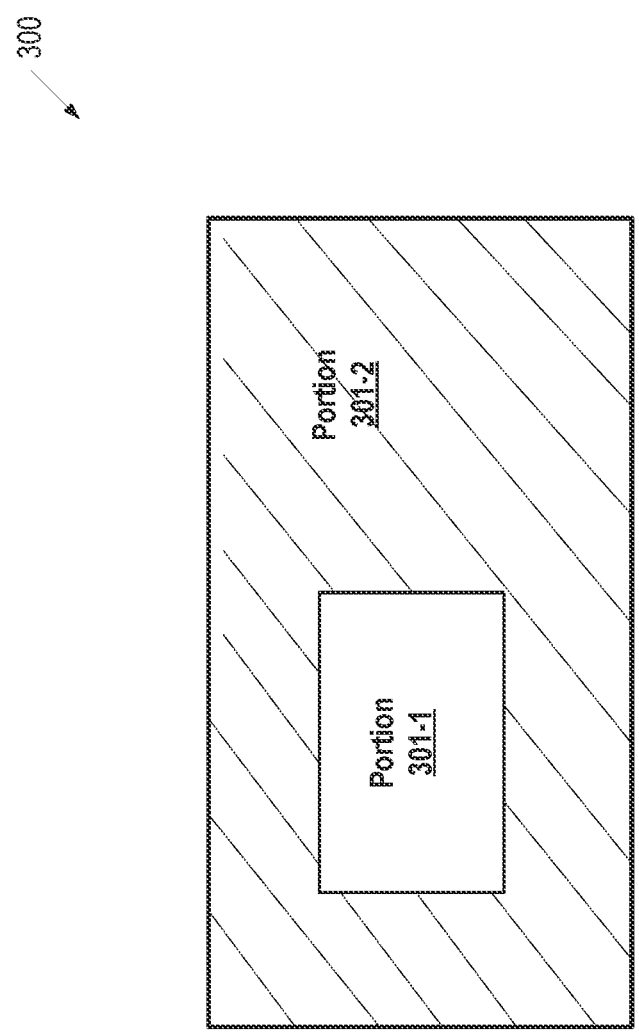
FIG. 3 depicts an illustrative composite image, in accordance with one or more aspects of the present disclosure.

Disclosed herein are aspects and implementations of an automated system that is capable of detecting instances in which a video frame has been reduced in size and embedded within a larger image (e.g., a larger image of a screen or a window on the screen). More particularly, in accordance with one implementation, a set of example images is generated and used to train a machine learning model. In particular, each of the example images is generated by taking two existing images (e.g., two frames of a movie, etc.) and juxtaposing them to form a single composite image (e.g., adjusting sizes of the first and second images to use the first image as a smaller foreground image placed in a smaller portion of the composite image, and to use the second image as a larger background image placed in a larger portion of the composite image). In FIG. 3, for example, the first image is placed within a smaller portion 301-1 of a full-sized image, and the second image is placed within a larger portion 301-2 of the full-sized image.

During training of the machine learning model, pixel data of a composite image is provided to the machine learning model as input, and one or more positions of the first image within the composite image are provided to the machine learning model as one or more target outputs (e.g., coordinates of the upper left and lower right corners of the first image, etc.). In this way, the machine learning model is trained to identify the position of a constituent image within a composite image.

After the machine learning model has been trained, a new image (e.g., an image with an embedded frame of an uploaded video, etc.) may be identified for processing. In this case, the position of a constituent image (e.g., the embedded frame of the uploaded video) within this new image is not known because the new image is provided in its entirety to the machine learning model, without any knowledge of how the new image was generated.

In one implementation, a plurality of spatial areas (e.g., rectangular areas, etc.) within the new image are defined (various examples are shown in FIGS. 5 through 8, and are discussed in detail below with respect to the method of FIG. 4). Pixel data of the new image is presented as input to the trained machine learning model, which generates one or more outputs based on the input. In one implementation, confidence data is then extracted from the output(s) of the trained machine learning model, where the confidence data includes, for each of the plurality of spatial areas, a level of confidence that a constituent image within the new image is located in that particular spatial area. For example, if an image similar to the image 300 of FIG. 3 is input to the trained machine learning model, and spatial areas 501-1 through 501-12 of FIG. 5 are defined as the plurality of spatial areas, then the machine learning model of aspects of the present disclosure may indicate a much higher level of confidence that the embedded image is located in spatial area 501-6, versus being located in spatial area 501-12. Particular aspects concerning the training and usage of the machine learning model will be described in greater detail below.

Aspects of the present disclosure thus provide a mechanism by which embedded images within full-sized images can be identified and located. This mechanism allows automated content detection techniques (e.g., automated techniques to detect material of another entity, classified material, etc.) to be "focused" on the relevant portions of full-sized images, rather than operating on the entire images. For example, if a user, in an attempt to circumvent the fingerprinting of a movie, reduces the size of each video frame of the movie and places each resulting video frame within a particular portion of a screen image, aspects of the present disclosure are able to detect the location of the image portion containing the video frames of the movie, and ensure that meaningful fingerprints of the movie are produced. Accordingly, when embodiments of the present disclosure are used in conjunction with automated content detection techniques, the accuracy of these techniques can be improved.

Figure 1:
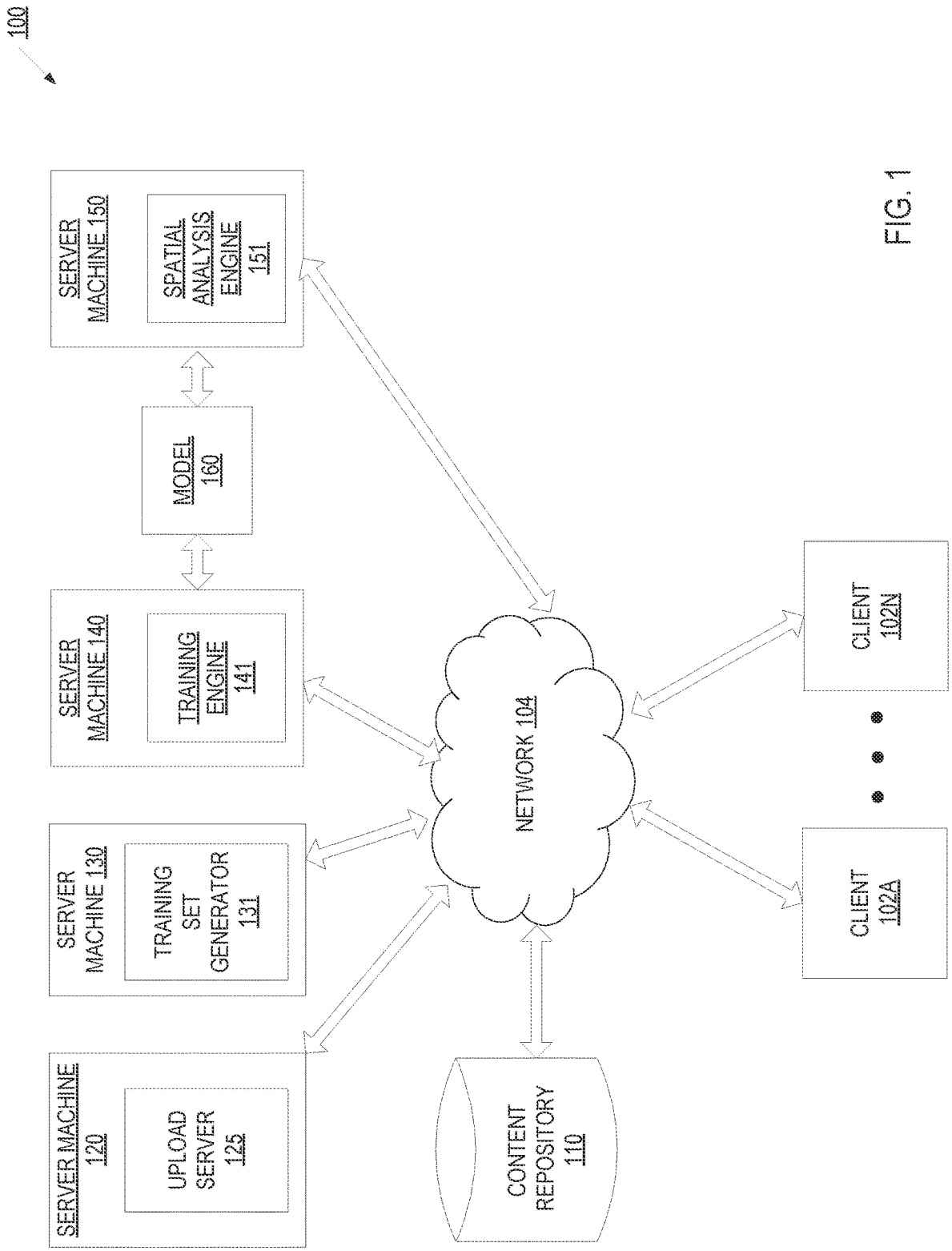
FIG. 1 depicts an illustrative computer system architecture, in accordance with one or more aspects of the present disclosure.

FIG. 1 illustrates an illustrative system architecture 100, in accordance with one implementation of the present disclosure. The system architecture 100 includes a server machine 120, one or more server machines 130 through 150, a content repository 110 and client machines 102A-102N connected to a network 104. Network 104 may be a public network (e.g., the Internet), a private network (e.g., a local area network (LAN) or wide area network (WAN)), or a combination thereof.

The client machines 102A-102N may be personal computers (PCs), laptops, mobile phones, tablet computers, set top boxes, televisions, video game consoles, digital assistants or any other computing devices. The client machines 102A-102N may run an operating system (OS) that manages hardware and software of the client machines 102A-102N. In one implementation, the client machines 102A-102N may upload videos to the web server for storage and/or processing.

Server machine 120 may be a rackmount server, a router computer, a personal computer, a portable digital assistant, a mobile phone, a laptop computer, a tablet computer, a camera, a video camera, a netbook, a desktop computer, a media center, or any combination of the above. Server machine 120 includes an upload server 125 that is capable of receiving content (e.g., videos, audio clips, images, etc.) uploaded by client machines 102A-102N (e.g., via a webpage, via an application, etc.).

Content repository 110 is a persistent storage that is capable of storing content items as well as data structures to tag, organize, and index the media items. Content repository 110 may be hosted by one or more storage devices, such as main memory, magnetic or optical storage based disks, tapes or hard drives, NAS, SAN, and so forth. In some implementations, content repository 110 may be a network-attached file server, while in other embodiments content repository 110 may be some other type of persistent storage such as an object-oriented database, a relational database, and so forth, that may be hosted by the server machine 120 or one or more different machines coupled to the server machine 120 via the network 104.

The content items stored in the content repository 110 may include user-generated media items that are uploaded by client machines, as well as media items from service providers such as news organizations, publishers, libraries and so forth. In some implementations, content repository 110 may be provided by a third-party service, while in some other implementations content repository 110 may be maintained by the same entity maintaining server machine 120. In some examples, content repository 110 and server machine 120 may be part of a content sharing platform that allows users to upload, consume, search for, approve of ("like"), dislike, and/or comment on media items.

The content sharing platform may include multiple channels. A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Each channel may include one or more media items. Examples of media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media items are also referred to as a video content item.

Media items may be consumed via media viewers executing on client machines 102A-102N. In one implementation, the media viewers may be applications that allow users to view content, such as images, videos (e.g., video content items), web pages, documents, etc. For example, the media viewers 112a-z may be a web browser that can access, retrieve, present, and/or navigate content (e.g., web pages such as Hyper Text Markup Language (HTML) pages, digital media items or content items, etc.) served by a web server. The media viewers may render, display, and/or present the content (e.g., a web page, a media viewer) to a user. The media viewers may also display an embedded media player (e.g., a Flash® player or an HTML5 player) that is embedded in a web page (e.g., a web page that may provide information about a product sold by an online merchant). In another example, the media viewers may be a standalone application (e.g., a mobile application) that allows users to view digital media content items (e.g., digital videos, digital images, electronic books, etc.).

The media viewers may be provided to the client devices 102A through 102N by the server 120 and/or content sharing platform. For example, the media viewers may be embedded media players that are embedded in web pages provided by the content sharing platform. In another example, the media viewers may be applications that communicate with the server 120 and/or the content sharing platform.

Server machine 130 includes a training set generator 131 that is capable of generating training data (e.g., a set of training inputs and target outputs) to train a machine learning model. Some operations of training set generator 131 are described in detail below with respect to FIG. 2.

Server machine 140 includes a training engine 141 that is capable of training a machine learning model 160. The machine learning model 160 may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160 that captures these patterns. The machine learning model may be composed of, e.g., a single level of linear or non-linear operations (e.g., a support vector machine [SVM] or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. In one aspect, the training set is obtained from server machine 130.

Server machine 150 includes a spatial analysis engine 151 that is capable of providing pixel data of images as input to trained machine learning model 160 and running trained machine learning model 160 on the input to obtain one or more outputs. As described in detail below with respect to FIG. 4, in one implementation spatial analysis engine 151 is also capable of extracting confidence data from the output of the trained machine learning model 160 and using the confidence data to estimate the position of embedded images in input images.

It should be noted that in some other implementations, the functions of server machines 120, 130, 140, and 150 may be provided by a fewer number of machines. For example, in some implementations server machines 130 and 140 may be integrated into a single machine, while in some other implementations server machines 130, 140, and 150 may be integrated into a single machine. In addition, in some implementations one or more of server machines 120, 130, 140, and 150 may be integrated into the content sharing platform.

In general, functions described in one implementation as being performed by the content item sharing platform, server machine 120, server machine 130, server machine 140, and/or server machine 150 can also be performed on the client devices 102A through 102N in other implementations, if appropriate. In addition, the functionality attributed to a particular component can be performed by different or multiple components operating together. The content sharing platform, server machine 120, server machine 130, server machine 140, and/or server machine 150 can also be accessed as a service provided to other systems or devices through appropriate application programming interfaces, and thus is not limited to use in websites.

Figure 2:
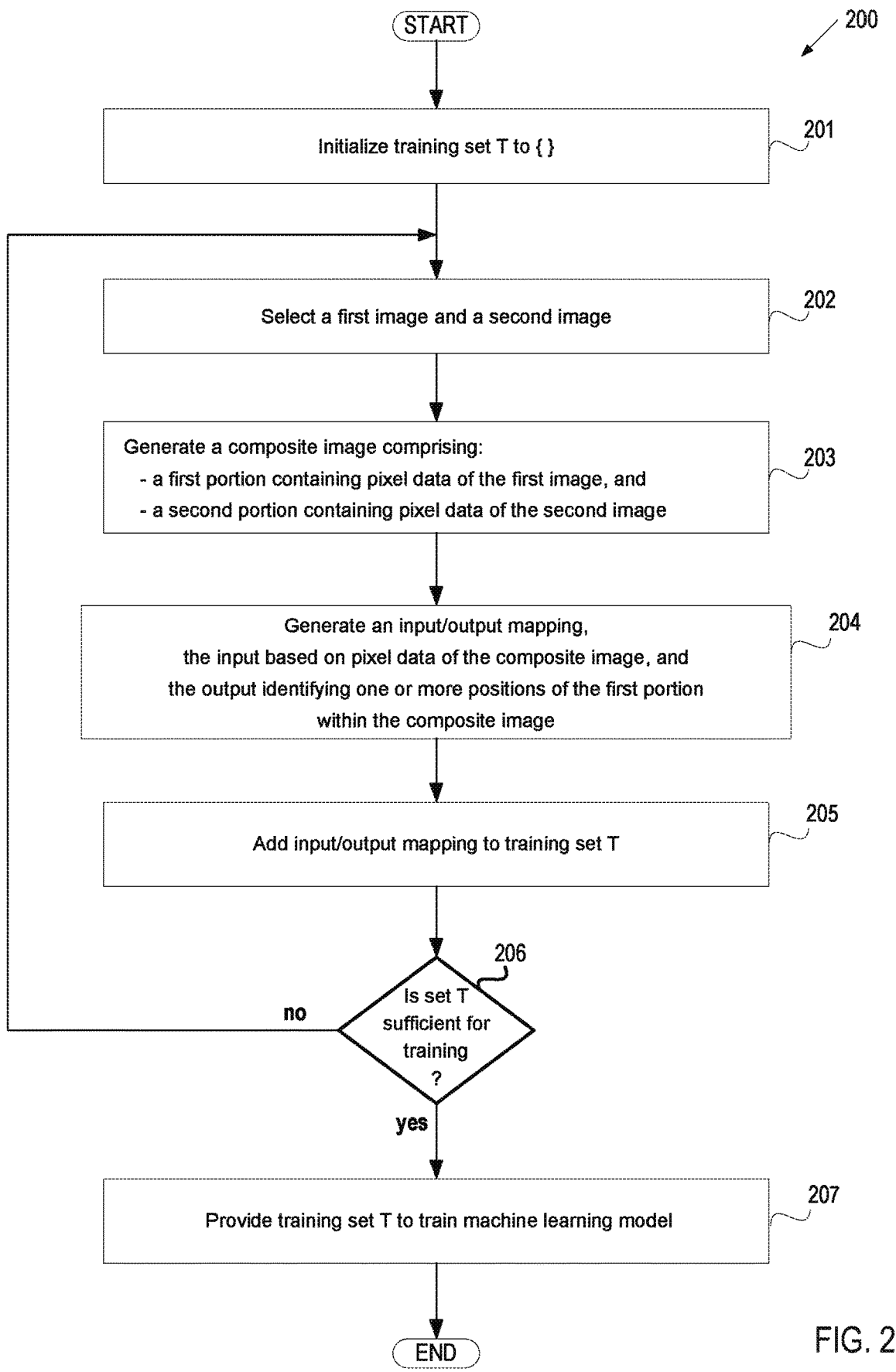
FIG. 2 depicts a flow diagram of one example of a method for training a machine learning model, in accordance with one or more aspects of the present disclosure.

FIG. 2 depicts a flow diagram of one example of a method 200 for training a machine learning model, in accordance with one or more aspects of the present disclosure. The method is performed by processing logic that may comprise hardware (circuitry, dedicated logic, etc.), software (such as is run on a general purpose computer system or a dedicated machine), or a combination thereof. In one implementation, the method is performed by computer system 100 of FIG. 1, while in some other implementations, one or more blocks of FIG. 2 may be performed by one or more other machines not depicted in the figures. In some aspects, one or more blocks of FIG. 2 may be performed by training set generator 131 of server machine 130.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Method 200 begins with generating training data for a machine learning model. In some implementations, at block 201, a training set T is initialized to an empty set. At block 202, a first image and a second image are selected as constituent images to generate a composite image, as described in detail below with respect to block 203. In one implementation, the first and second images are randomly-selected video frames (e.g., two different frames from a particular video, a first frame from a first video and a second frame from a second video, etc.). It should be noted that in some other implementations, the images may be selected in some other manner, and may not be part of a video (e.g., still photographs, etc.).

At block 203, a composite image is generated based on the first and second constituent images that were selected at block 202. In one implementation, the composite image comprises two portions, one portion containing pixel data of the first constituent image, and the second portion containing pixel data of the second constituent image. FIG. 3 depicts an illustrative composite image 300; as shown in the figure, composite image 300 comprises a first image in a portion 301-1 and a second image in a portion 301-2. In one example, the composite image may be generated to mimic an attempt by a malicious user to "sneak" an improper image (e.g., a copyrighted image, an age-inappropriate image, etc.) through an automated detection system (e.g., a fingerprint-based detection system).

It should be noted that the relative sizes of portions may be different than that depicted in FIG. 3 (e.g., the interior portion might occupy a larger proportion of the composite image than in FIG. 3, such as 40% of the composite image, 70% of the composite image, etc.). Similarly, the spatial arrangement of portions may be different than that depicted in FIG. 3 (e.g., side-by-side horizontally, side-by-side vertically, etc.).

It should further be noted that in the case of one portion being surrounded by another portion, as in FIG. 3, the composite image might be generated by superimposing a "foreground" image on top of a portion of a "background" image. In addition, pixels on the borders separating portions may be processed (e.g., anti-aliased, etc.) in order to mimic an attempt by a malicious user to make edge detection more difficult.

At block 204, an input/output mapping is generated. The input/output mapping refers to the training input that includes or is based on pixel data of the composite image (e.g., red/green/blue intensity values of the pixels of the composite image, etc.), and the target output for the training input, where the target output identifies one or more positions of the first portion (the portion that contains the pixel data of the first constituent image) within the composite image (e.g., coordinates of the upper left and lower right corners of the first portion, etc.), and where the training input is associated with (or mapped to) the target output. At block 205, the input/output mapping generated at block 204 is added to training set T.

Block 206 branches based on whether training set T is sufficient for training machine learning model 160. If so, execution proceeds to block 207, otherwise, execution continues back at block 202. It should be noted that in some implementations, the sufficiency of training set T may be determined based simply on the number of input/output mappings in the training set, while in some other implementations, the sufficiency of training set T may be determined based on one or more other criteria (e.g., a measure of diversity of the training examples, etc.) in addition to, or instead of, the number of input/output mappings.

At block 207, training set T is provided to train machine learning model 160. In one implementation, training set T is provided to training engine 141 of server machine 140 to perform the training. In the case of a neural network, for example, input values of a given input/output mapping (e.g., pixel values of a training image, etc.) are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in training set T. After block 207, machine learning model 160 can then be used to process images (for example, in accordance with method 400 of FIG. 4, described below).

Figure 4:
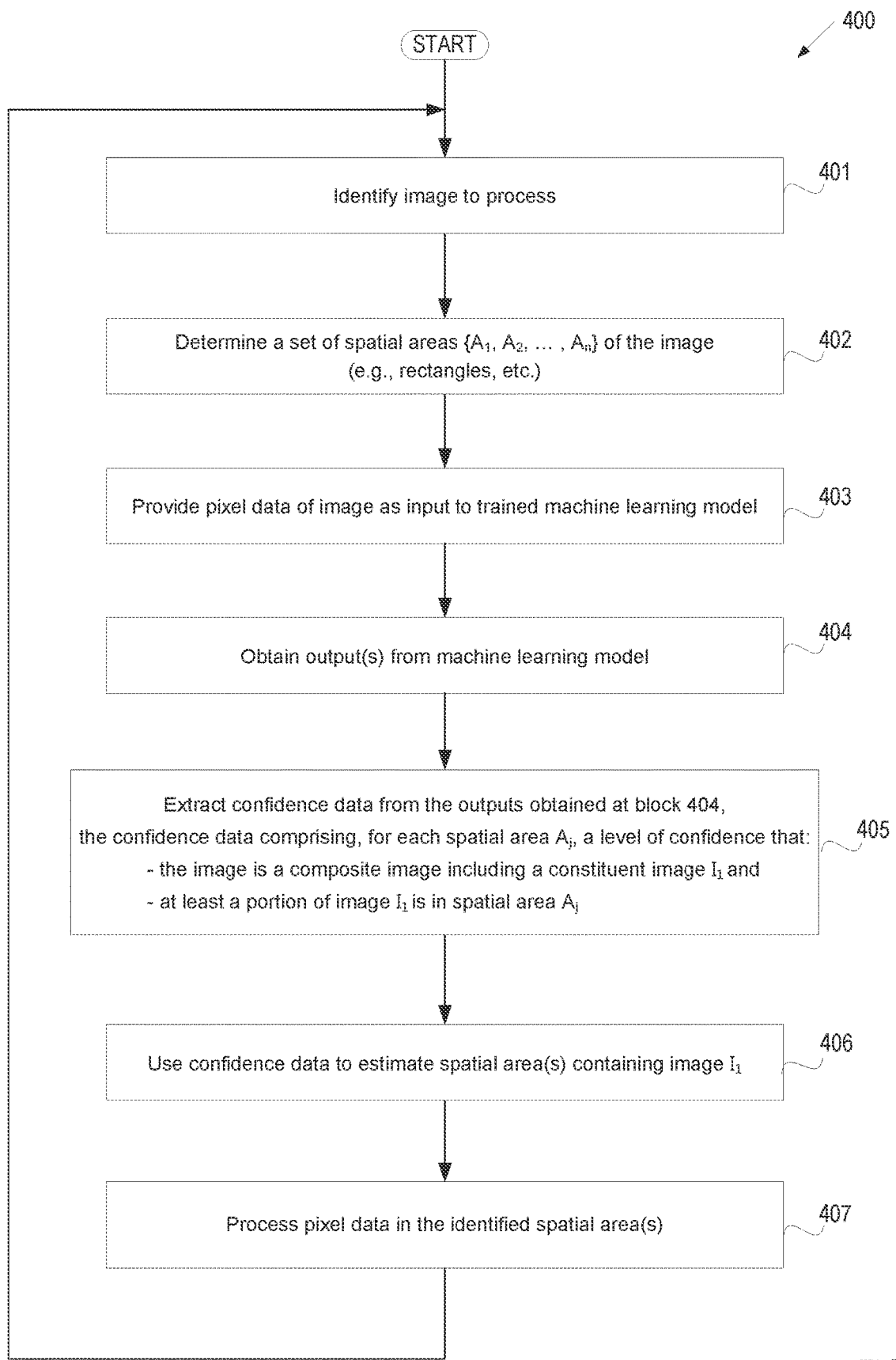
FIG. 4 depicts a flow diagram of one example of a method for processing images using a trained machine learning model, in accordance with one or more aspects of the present disclosure.

FIG. 4 depicts a flow diagram of one example of a method 400 for processing images using a trained machine learning model, in accordance with one or more aspects of the present disclosure. The method is performed by processing logic that may comprise hardware (circuitry, dedicated logic, etc.), software (such as is run on a general purpose computer system or a dedicated machine), or a combination thereof. In one implementation, the method is performed using the server machine 150 and trained machine learning model 160 of FIG. 1, while in some other implementations, one or more blocks of FIG. 4 may be performed by one or more other machines not depicted in the figures.

Method 400 may include receiving an input image (e.g., from a user device or a server such as upload server 125) and processing the input image using a trained model such as trained machine learning model 160. The trained model may be configured to generate, based on pixel data of the input image, one or more outputs indicating (i) a level of confidence that the input image is a composite image including a constituent image, and (ii) a spatial area that includes the constituent image within the input image.

In some implementations, at block 401, an image (input image) may be identified for processing. In one example, the image is a frame of an uploaded video (e.g., a video uploaded to a content sharing platform).

Figure 7:
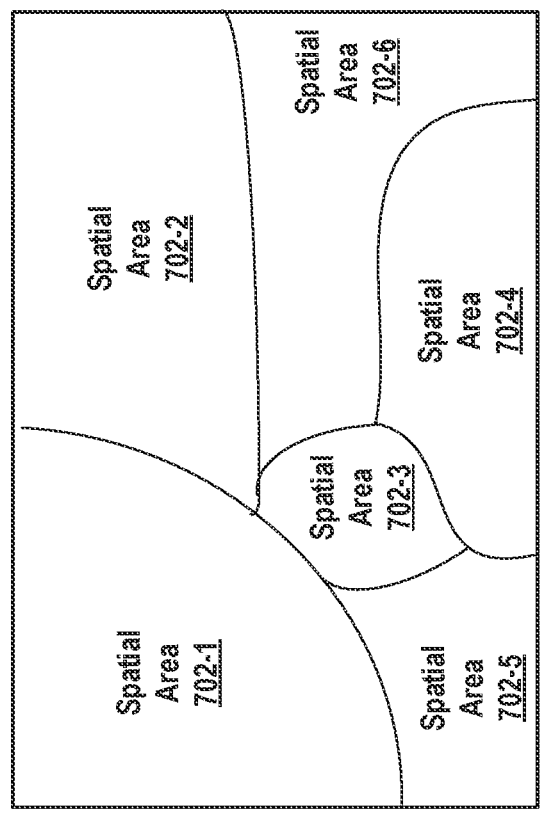
FIG. 7 depicts a third set of spatial areas of an image, in accordance with one or more aspects of the present disclosure.
Figure 8:
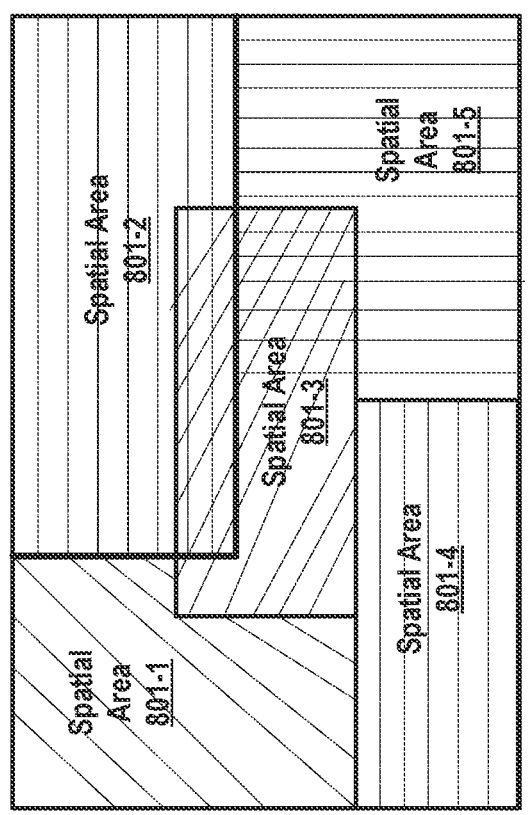
FIG. 8 depicts a fourth set of spatial areas of an image, in accordance with one or more aspects of the present disclosure.

At block 402, a set of spatial areas $\{A_1, A_2, \ldots, A_n\}$ of the image is determined. Various examples of spatial areas are depicted in FIGS. 5 through 8. In FIG. 5, the spatial areas are equally-sized rectangles (uniform in size and shape) 501-1 through 501-12, while in FIG. 6, the spatial areas 601-1 through 601-9 are rectangular but are not equally-sized (i.e., have different sizes). In FIG. 7, the spatial areas 701-1 through 701-6 are non-polygonal (e.g., bounded by parametric curves, etc.), while in FIG. 8, the spatial areas 801-1 through 801-5 are overlapping non-uniformly-sized rectangles. It should be noted that other spatial area definitions are possible, such as other types of polygonal areas (e.g., triangles, hexagons, non-rectangular quadrilaterals, etc.), differently-shaped polygonal areas (e.g., some of the areas triangular and other areas rectangular, etc.), overlapping non-polygonal areas, non-overlapping polygonal or non-polygonal areas, and so forth. Moreover, although in the examples of FIGS. 5 through 8 the spatial areas cover the entire image (i.e., the union of the spatial areas contains all the pixels of the image), in some other examples this might not be the case.

It should further be noted that in some other implementations, images may be rendered on a non-planar surface (e.g., the inside of a hemisphere in a virtual reality application, etc.). In such cases, the spatial areas may be three-dimensional surfaces, rather than two-dimensional.

At block 403, pixel data of the image is provided as input to the trained machine learning model, and at block 404, one or more outputs are obtained from the trained machine learning model. At block 405, confidence data is extracted from the output(s) obtained at block 404. In one implementation, the confidence data comprises, for each spatial area $A_j$ of the image, a level of confidence that the image is a composite image including a constituent image $I_1$ (and in some implementations also at least one more other image $I_2$), with at least a portion of image $I_1$ in spatial area $A_j$ (and in some implementations, also at least a portion of image $I_2$ in spatial area $A_d$). In one example, the level of confidence is a real number between 0 and 1 inclusive. It should be noted that the level of confidence may not be a probability (for example, the sum of the confidence levels for all spatial areas may not equal 1).

At block 406, the confidence data is used to estimate one or more spatial areas containing image $I_1$ (and in some implementations, also one or more spatial areas containing image $I_2$). In some implementations, if the level of confidence for a spatial area satisfies a threshold condition, then such a spatial area is identified as containing image $I_1$. For example, the spatial area that has the highest level of confidence may be identified as containing image $I_1$, while in some other examples, one or more spatial areas may be identified as containing $I_1$ if such spatial areas have a level of confidence above a particular threshold.

At block 407, pixel data in the identified spatial area(s) is processed. In some implementations, the processing of pixel data may comprise a determination of whether the pixel data is inappropriate for upload to the content sharing platform (e.g., copyrighted material, age-inappropriate material, etc.). As described above, such processing is facilitated by honing in on where in the overall image the smaller image is located. In some implementations, processing of the pixel data includes extracting the pixel data (constituent image) from the identified spatial area, creating a fingerprint of the constituent image based on the extracted pixel data, and comparing the created fingerprint with stored fingerprints of multiple images to determine whether the constituent image is similar to any of the multiple images. It should be noted that if multiple constituent images are identified in the composite image using the trained model, the above operations (including operations of blocks 406 and 407) can be performed for each constituent image.

After block 407, execution continues back at block 401 for processing of another image (e.g., the next frame of the uploaded video, etc.).

Figure 9:
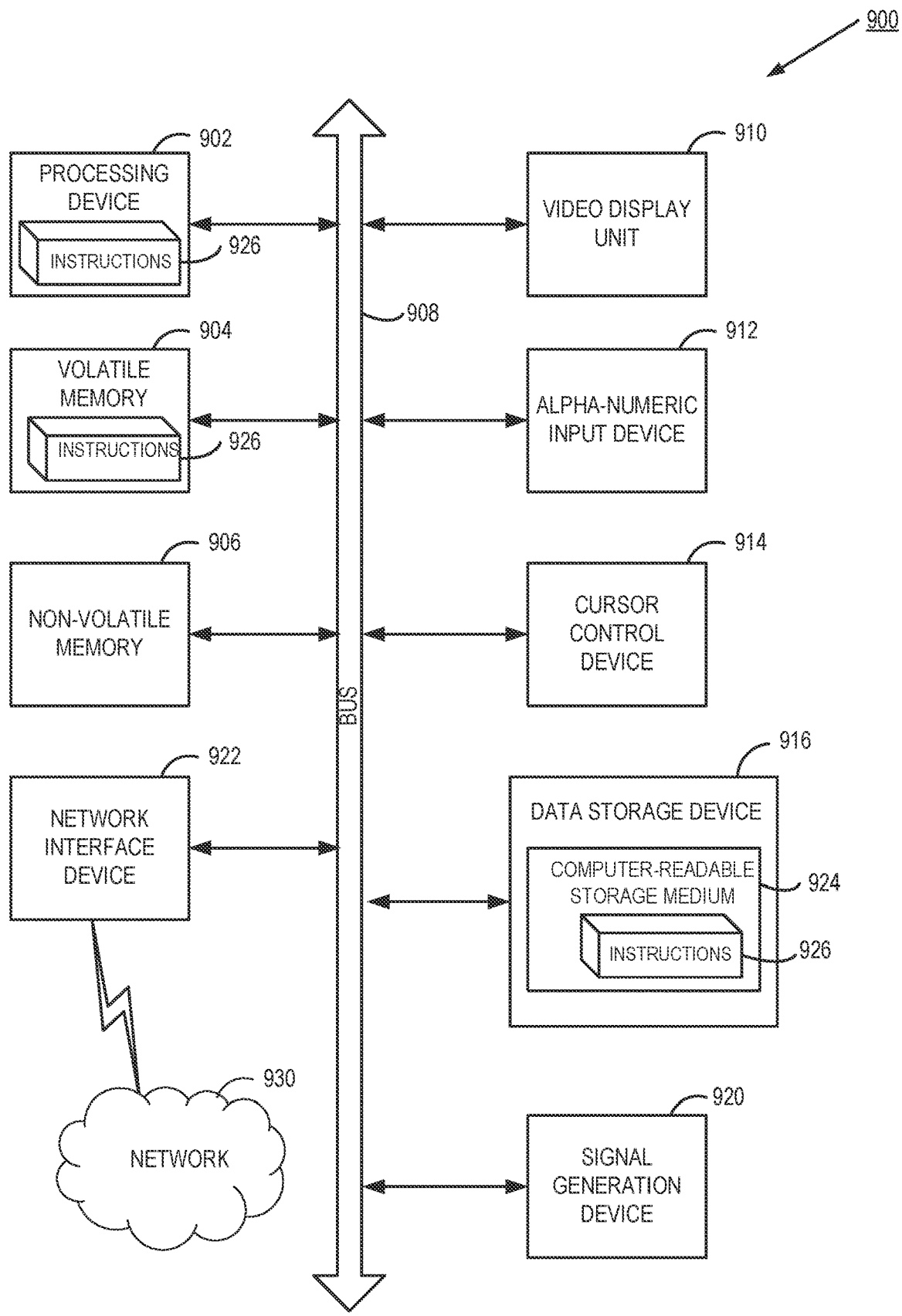
FIG. 9 depicts a block diagram of an illustrative computer system operating in accordance with one or more aspects of the disclosure.

FIG. 9 depicts a block diagram of an illustrative computer system 900 operating in accordance with one or more aspects of the disclosure. In various illustrative examples, computer system 900 may correspond to a computing device within system architecture 100 of FIG. 1. In certain implementations, computer system 900 may be connected (e.g., via a network 630, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alphanumeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions for implementing methods 200 and 400 of FIGS. 2 and 4, respectively.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "generating," "providing," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
a memory to store instructions; and
a processing device to execute the instructions to perform operations comprising:
generating training data for a machine learning model, wherein the training data comprises:
pixel data of a composite image having a first portion containing pixel data of a first constituent image, and a second portion containing pixel data of a second constituent image, the first portion being located at a particular position within the composite image; and providing the training data to train the machine learning model on pixel data of a plurality of composite images including the composite image, wherein the trained machine learning model is to receive a new image as input and to produce a new output based on the new image, the new output indicating whether the new image is a composite image containing a constituent image.

2. The system of claim 1 wherein the second portion of the composite image surrounds the first portion of the composite image.

3. The system of claim 1 wherein the first constituent image is a frame of a first video and the second constituent image is a frame of a second video.

4. The system of claim 1 wherein the position of the first portion within the composite image comprises coordinates of an upper left corner of the first constituent image and coordinates of a lower right corner of the first constituent image.

5. The system of claim 1 wherein the training data includes, for each of the plurality of composite images, pixel data of a corresponding composite image, a position of a first portion within the corresponding composite image, and a mapping of the pixel data of the corresponding composite image to the position of the first portion within the corresponding composite image.

6. The system of claim 1 wherein the new output indicates (i) a level of confidence that the new image is a composite image including a constituent image, and (ii) a spatial area in which the constituent image is located within the new image.

7. A method comprising:
providing pixel data of a first image as input to a machine learning model trained using training data comprising pixel data of a plurality of composite images that each include pixel data of respective constituent images;
obtaining one or more outputs from the trained machine learning model; and
extracting, from the one or more outputs, an indication that the first image is a composite image that includes a constituent image, wherein at least a portion of the constituent image is in a spatial area of the first image.

8. The method of claim 7, wherein:
the indication that the first image is a composite image including a constituent image comprises a level of confidence value; and
the method further comprises:
determining that the level of confidence value satisfies a threshold condition; and
extracting the constituent image from the spatial area of the first image.

9. The method of claim 7 wherein the spatial area is one of a plurality of spatial areas of the first image, and wherein the plurality of spatial areas are uniform in size and shape.

10. The method of claim 7 wherein the spatial area is one of a plurality of spatial areas of the first image, and wherein at least two of the plurality of spatial areas have different sizes.

11. The method of claim 7 wherein the spatial area is one of a plurality of spatial areas of the first image, and wherein at least two of the plurality of spatial areas overlap.

12. The method of claim 7 wherein the spatial area is one of a plurality of spatial areas of the first image, and wherein the plurality of spatial areas are non-overlapping.

13. The method of claim 7 wherein the spatial area is one of a plurality of spatial areas of the first image, and wherein at least two of the plurality of spatial areas have different shapes.

14. The method of claim 7 wherein the training data comprises an input-output mapping comprising an input and an output, the input based on pixel data of a composite image, the composite image comprising a first portion containing pixel data of a second image and a second portion containing pixel data of a third image, and the output identifying a position of the first portion within the composite image.

15. A non-transitory computer readable medium comprising instructions, which when executed by a processing device, cause the processing device to perform operations comprising:
receiving an input image;
processing the input image using a machine learning model trained based on training data comprising pixel data of a plurality of composite images that each include pixel data of respective constituent images; and
obtaining, based on the processing of the input image using the trained machine learning model, one or more outputs comprising an indication that the input image is a composite image including a constituent image, wherein at least a portion of the constituent image is in a spatial area of the input image.

16. The non-transitory computer readable medium of claim 15, wherein:
the indication that the input image is a composite image including a constituent image comprises a level of confidence value; and
the operations further comprise:
determining that the level of confidence value satisfies a threshold condition; and
extracting the constituent image from the spatial area within the input image.

17. The non-transitory computer readable medium of claim 15 wherein the input image comprises a second constituent image that surrounds the constituent image.

18. The non-transitory computer readable medium of claim 15 wherein the constituent image is a frame of a video.

19. The non-transitory computer readable medium of claim 15 wherein the spatial area is one of a plurality of spatial areas of the input image, and wherein a union of the plurality of spatial areas contains all pixels of the input image.

20. The non-transitory computer readable medium of claim 15 wherein the spatial area is one of a plurality of spatial areas of the input image, and wherein the plurality of spatial areas are uniform in size and shape.

21. The non-transitory computer readable medium of claim 15 wherein the spatial area is one of a plurality of spatial areas of the input image, and wherein at least two of the plurality of spatial areas have different sizes.

22. The non-transitory computer readable medium of claim 15 wherein the spatial area is one of a plurality of spatial areas of the input image, and wherein at least two of the plurality of spatial areas have different shapes.

* * * * *